United States Patent [19]
Schneider

[11] Patent Number: 6,109,683
[45] Date of Patent: Aug. 29, 2000

[54] FLUSH FLOOR SLIDE-OUT ROOM SUPPORT SYSTEM

[75] Inventor: Robert H. Schneider, Beaver Dam, Wis.

[73] Assignee: Applied Power Inc., Waukesha, Wis.

[21] Appl. No.: 09/179,782

[22] Filed: Oct. 27, 1998

Related U.S. Application Data

[60] Provisional application No. 60/071,904, Jan. 20, 1998.

[51] Int. Cl.[7] ........................................... B60P 3/34
[52] U.S. Cl. ......................... 296/171; 296/165; 296/175; 296/26.14
[58] Field of Search .................... 296/165, 171, 296/172, 175, 176, 26.13, 26.14

[56] References Cited

U.S. PATENT DOCUMENTS

| | | | |
|---|---|---|---|
| 3,106,750 | 10/1963 | Jarman | 20/2 |
| 5,090,749 | 2/1992 | Lee | 296/171 |
| 5,491,933 | 2/1996 | Miller et al. | 52/67 |
| 5,577,351 | 11/1996 | Dewald, Jr. et al. | 52/67 |
| 5,620,224 | 4/1997 | DiBiagio et al. | 296/26 |
| 5,787,650 | 8/1998 | Miller et al. | 296/26.14 X |

*Primary Examiner*—D. Glenn Dayoan
*Assistant Examiner*—Jason Morrow
*Attorney, Agent, or Firm*—Quarles & Brady LLP

[57] ABSTRACT

The outer side of a slide-out floor is supported by the outer end of an inner rail member. The inner rail member is telescopically angled within an outer rail member such that the angle increases as the inner rail member is extended, so as to position the outer end of the slide-out floor at an elevation that is substantially flush with the fixed floor when the slide-out floor is fully extended.

5 Claims, 4 Drawing Sheets

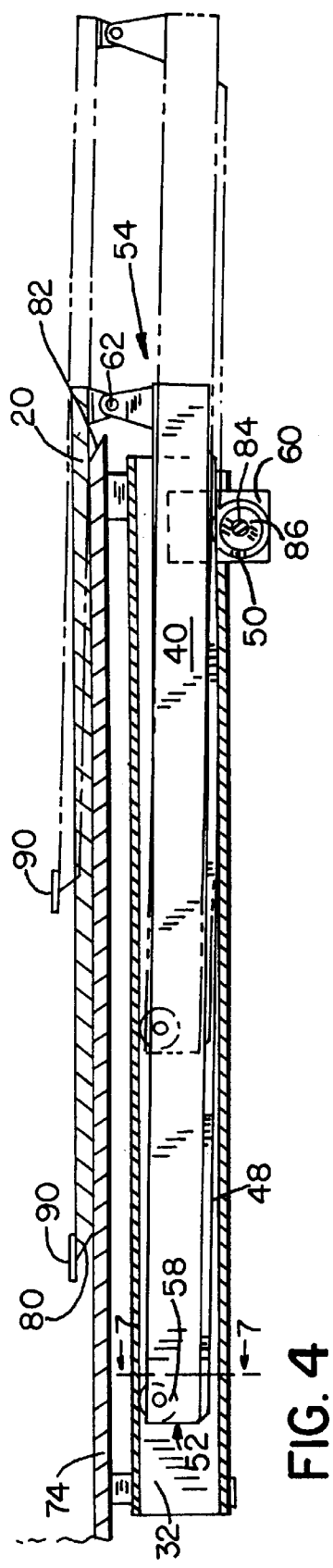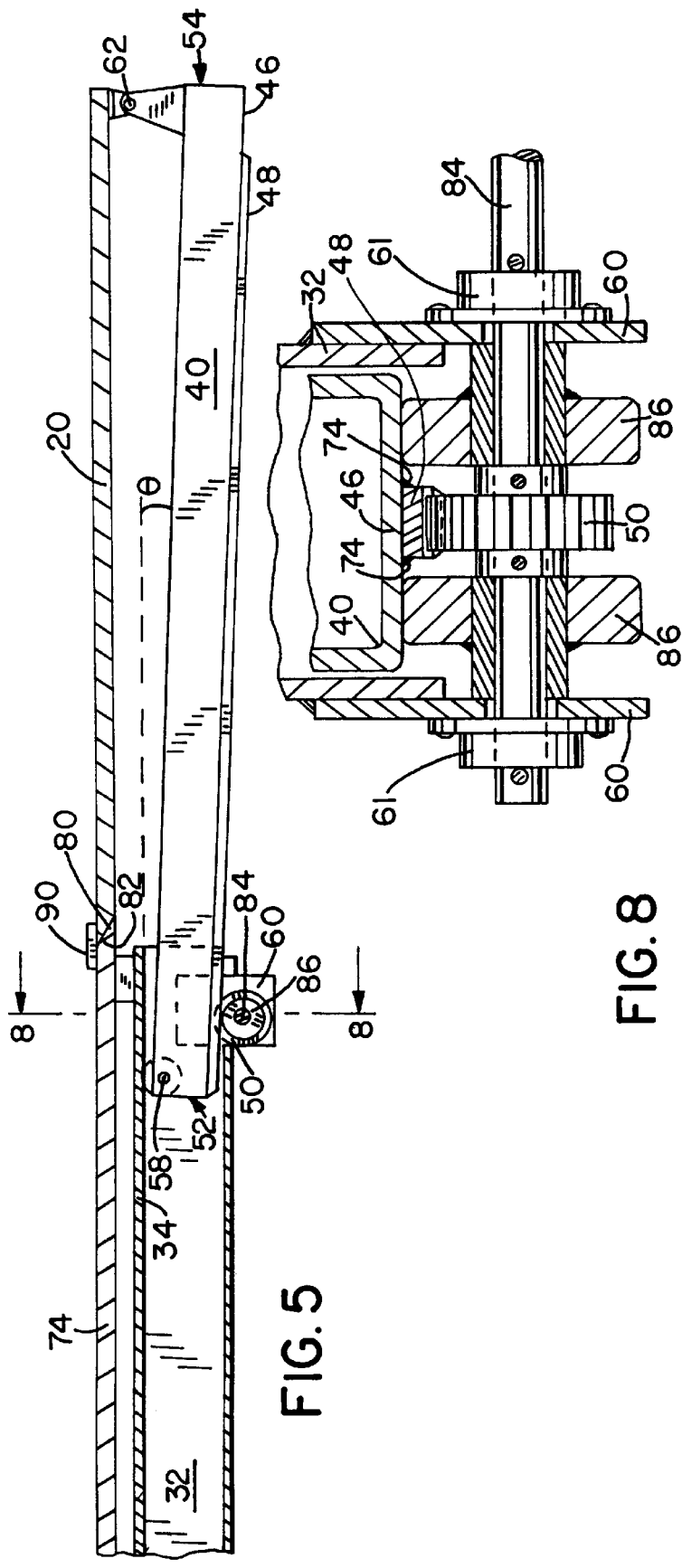

FLUSH FLOOR SLIDE-OUT ROOM SUPPORT SYSTEM

CROSS-REFERENCE TO RELATED APPLICATIONS

This claims the benefit of U.S. Provisional Patent Application Ser. No. 60/071,904 filed Jan. 20, 1998.

STATEMENT REGARDING FEDERALLY SPONSORED RESEARCH OR DEVELOPMENT

Not applicable.

FIELD OF THE INVENTION

This invention relates to slide-out rooms for recreational vehicles, and particularly to a slide-out room support system for providing a flush floor when the room is expanded.

BACKGROUND OF THE INVENTION

In order to increase available interior space of recreational vehicles, e.g., motor homes and trailer homes, slide-out rooms or sections are provided. During transit, these rooms are retracted and stored in the interior of the vehicle or trailer, with the exterior end wall of the slide-out room approximately flush with the adjacent exterior wall of the vehicle or trailer. To use the slide-out room, the vehicle is parked and leveled. The slide-out room is then slid outward from the vehicle, using the slide-out room support system, thereby increasing the interior space of the vehicle.

These slide-out rooms usually include a floor, a roof, an end wall and one or more side walls. In the retracted position, the roof, floor and side walls are typically inside the stationary part of the vehicle, concealed from exterior view, and the room end wall forms a portion of the vehicle side wall. The floor of the slide-out room typically rests on the floor of the stationary part of the vehicle, and may form a portion of the usable interior floor during transit of the vehicle.

In prior art constructions, the floor of the slide-out room is moved generally horizontally to an extended position. Unless the slide-out floor is somehow lowered by approximately the height of its upper surface above the upper surface of the stationary floor, the slide-out floor remains above the fixed floor in the extended position, creating a height differential, or step up, between the stationary floor and the moveable floor. This height differential is undesirable, inconvenient and creates a trip hazard.

Many methods are known in the art that attempt to avoid a height differential between the fixed and slide-out floors. In U.S. Pat. No. 5,090,749 issued on Feb. 25, 1992 to Lee, wheels of a slide out floor inner rail support member settle into recesses thereby lowering the extended slide-out floor to the same level as the fixed floor. Other methods utilize a mechanical linkage to raise and lower the slide-out floor as disclosed, for example, in U.S. Pat. No. 5,577,351 issued on Nov. 26, 1996 to Dewald et al., or require the entire slide-out floor to traverse a ramp thereby lowering the slide-out floor to the desired elevation as disclosed in U.S. Pat. No. 5,620,224 issued on Apr. 15, 1997 to DiBiagio et al. These structures can be unduly complex, high in cost, difficult to manufacture, and heavy.

Typical prior art flush floor slide-out room operating systems require an abrupt change in direction to lower the floor when extending the room, or to raise the floor when retracting. This change in motion increases the peak power required of the operating system since upon retraction, essentially the entire room must be lifted abruptly, and also increases the potential for failure during extension, since the entire floor is abruptly dropped.

One known structure incorporates an angled outer rail that has a substantially parallel telescoping inner rail connected to the slide-out floor. This configuration positions the slide-out floor as it is extended. This structure, however, requires precious space under the slide-out floor to accommodate the angled outer rail. It therefore remains desirable to provide a flat floor arrangement that is simple, economical to manufacture, dependable in use and fits into the available space.

SUMMARY OF THE INVENTION

The present invention provides a flush floor slide-out room support system that accomplishes the above objectives. The outer rail is fixed to the vehicle frame or chassis so that it is substantially parallel to the stationary floor, and the inner rail is downwardly and outwardly angled within the outer rail. As the inner rail is telescopically extended, the angle increases, so that the moveable floor is gently and continuously lowered to an elevation so that it is coplanar with the stationary floor when fully extended.

Any type of drive system may be used with the present invention, for example, rack and pinion, hydraulic or cable. It is preferred to provide a roller or other anti-friction means on the top side of the inner end of the inner end of the inner rail, to reduce the friction there as the rails are telescoped, and to provide rollers or other anti-friction means below the inner rail at the outer end of the outer rail, to reduce the friction there.

The invention could also be applied to a system in which the support for the inner rail is not an outer rail, but some other form of fixed frame, having roller or other anti-friction means for supporting the rail that is fixed to the moveable floor.

Various other objects, features and advantages of the invention will be apparent from the following description taken together with the drawings.

BRIEF DESCRIPTION OF THE DRAWINGS

FIG. 4 is a longitudinal sectional view through one of the sets of rails of the support system of FIGS. 1–3 in the retracted position;

FIG. 5 is a view like FIG. 4, but with the rails in the extended position;

FIG. 8 is a sectional view from the plane of the line 8—8 of FIG. 5.

DETAILED DESCRIPTION OF THE PREFERRED EMBODIMENTS

Figure 1:
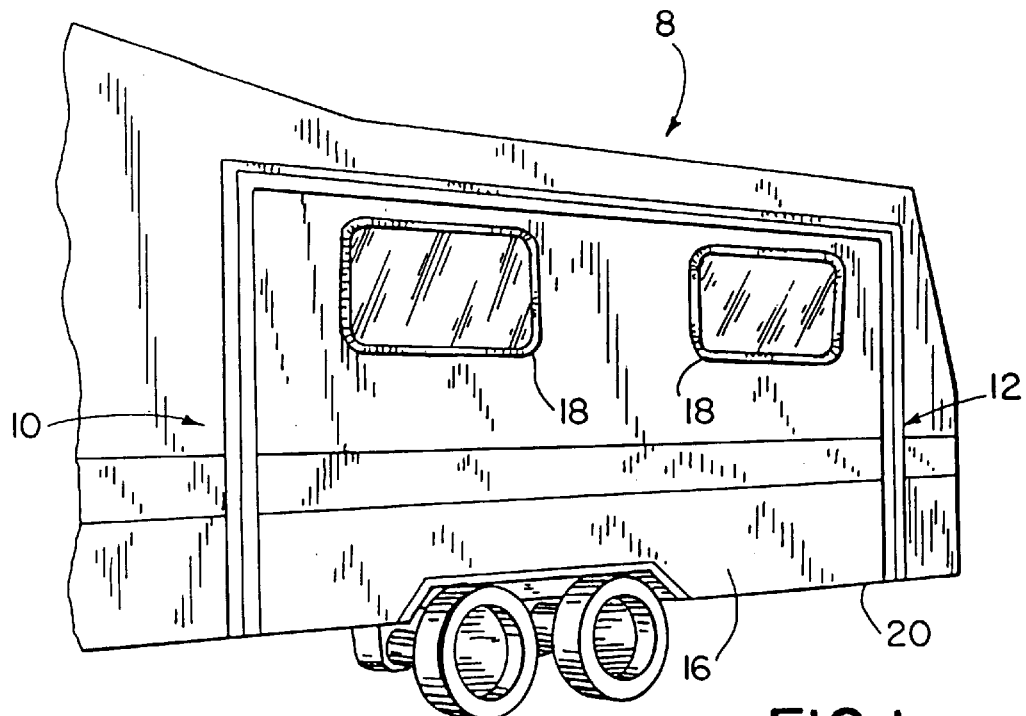
FIG. 1 is a partial perspective view of a slide-out room of a recreational vehicle employing the present invention in a retracted position.
Figure 2:
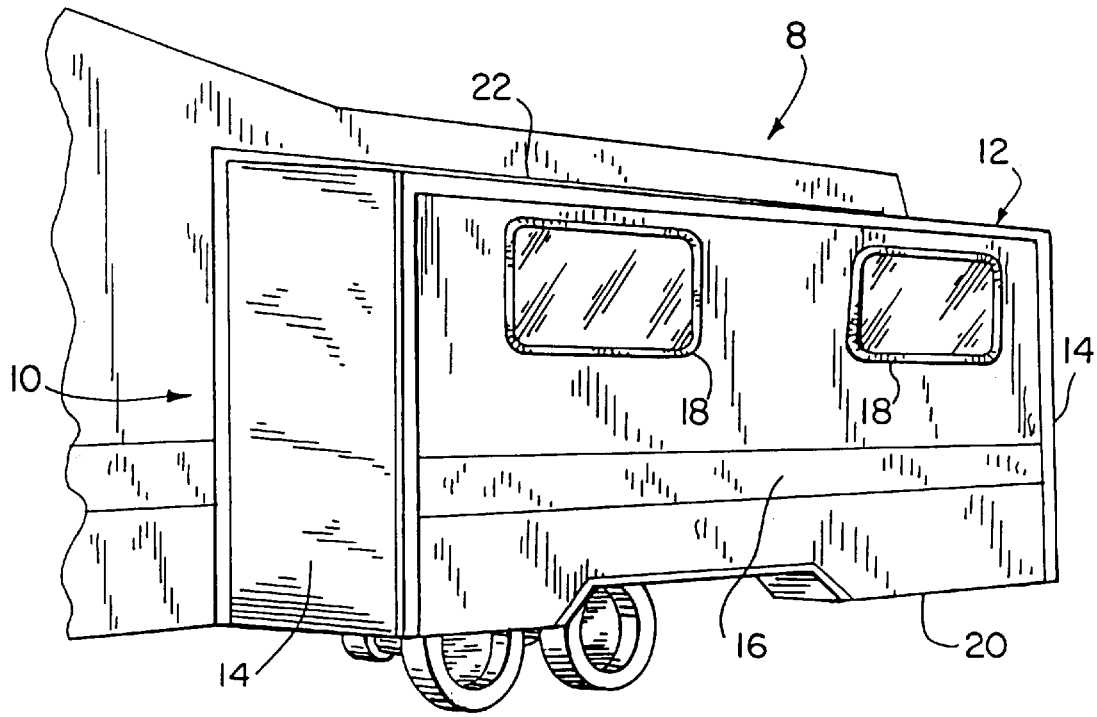
FIG. 2 is a partial perspective view of the slide-out room of FIG. 1 in an extended position.

Referring to FIGS. 1 and 2, a recreational vehicle 10 (generally referred to as a vehicle) is equipped with a laterally adjustable wing or slide-out room section used to provide additional interior space. However, it should be understood that the invention can also apply to expandable sections or compartments provided on other vehicles for use in construction, military, medical, education, mobile broadcast and other applications to expand the inside volume of a vehicle.

FIG. 1 illustrates the vehicle body 10 having mounted thereon an expandable, telescopic slide-out room section 12 incorporating the present invention in its fully retracted position. FIG. 2 is a similar view with the slide-out section 12 fully extended. Slide-out section 12 is rectangularly configured and includes a pair of sidewalls 14, an end wall 16, with two windows 18, a floor 20 and a roof 22. An arrangement for mounting the outer rails of the present invention to a vehicle 10 and driving the movement of the slide-out room section 12 is fully described in U.S. Pat. No. 5,758,918 issued Jun. 2, 1998, which is hereby incorporated by reference. That system is an electric motor operated rack and pinion gear drive system, for extending and retracting the inner rails relative to the outer rails. The present invention is not limited to driving it using a rack and pinion system, but could be operated by any suitable drive means, such as for example a hydraulic cylinder drive system such as is shown in Dewald, Jr. U.S. Pat. No. 5,295,430, or a cable drive system as is shown in Lee U.S. Pat. No. 5,090,749.

Figure 3:
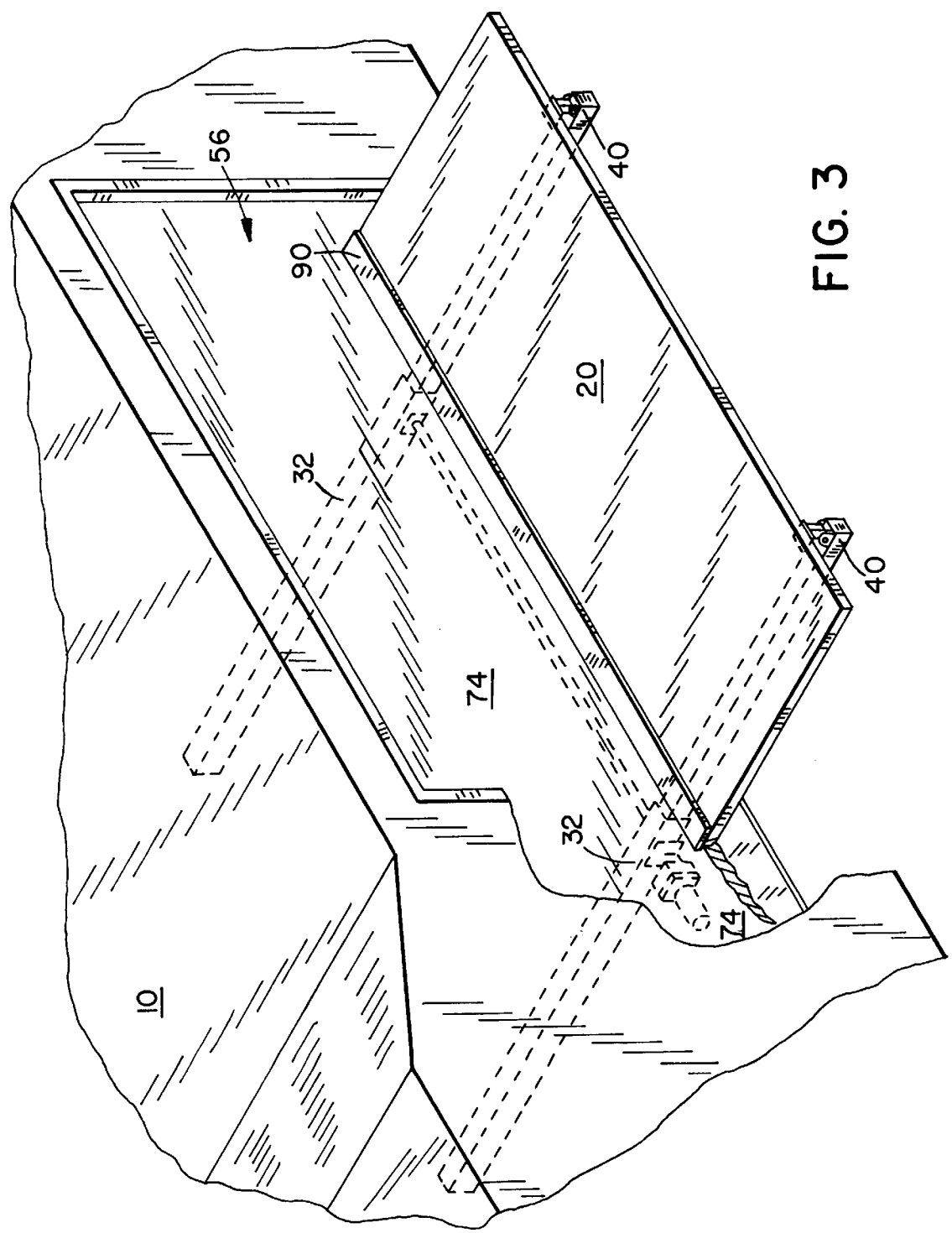
FIG. 3 is a partial perspective view of the floor of the room of FIGS. 1 and 2 alone (without the sides, end and roof) and in an extended position.
Figure 7:
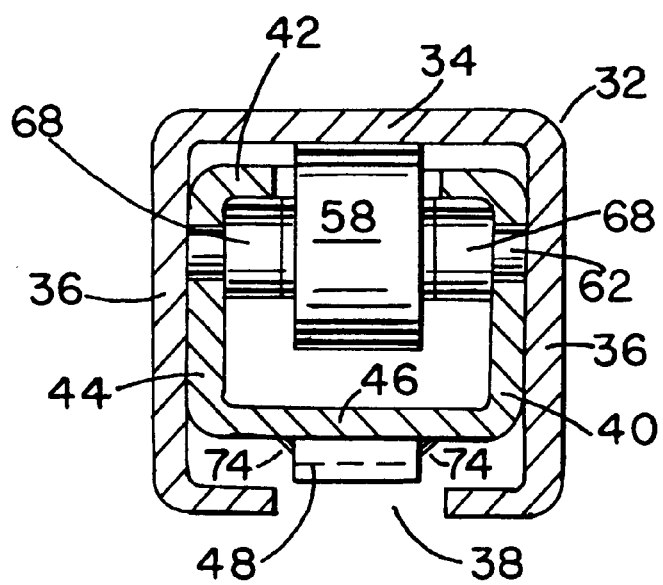
FIG. 7 is a sectional view from the plane of the line 7—7 of FIG. 4.

The present invention may be incorporated into a slide-out room section 12 with a movable floor as fully described in U.S. patent application Ser. No. 08/823,168 filed on Mar. 25, 1997, which is hereby incorporated by reference, or by any other suitable means. As shown in FIG. 3, the slide-out floor 20 of slide out section 12 includes a pair of substantially parallel, hollow outer rail members 32. Each outer rail member, as shown in FIGS. 7 and 8, is a rectangular tube, having a generally closed upper wall 34, closed side walls 36 and a bottom wall 38. The bottom wall 38 may be open (as illustrated in FIG. 7) for its entire length, or may be closed for most of its length but open at its outer end, to permit drive gear 50 to engage rack 48, and rollers 86 to support inner rail 40. Each of the outer rail members 32 is mounted to and supported by structural frame members of the vehicle 10 by any suitable means, such as welding or bolting, so that they are substantially parallel with the stationary floor of the stationary room portion 56 of the vehicle 10.

Figure 6:
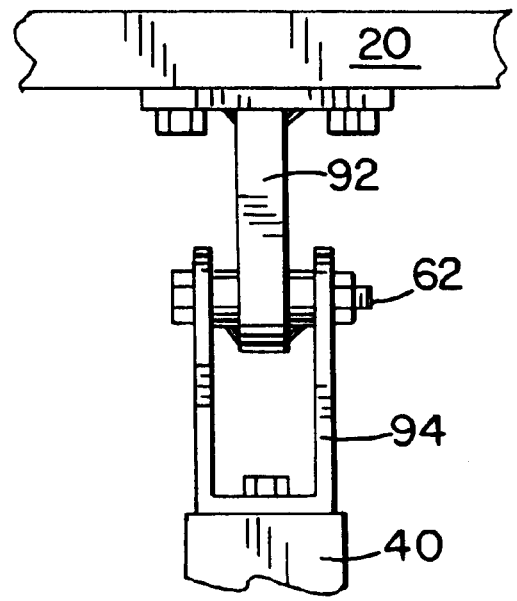
FIG. 6 is a front plan view of the pivotal connection between the slide-out floor and inner rail member of FIG. 5.

Slidably carried for longitudinal movement in each outer rail member 32 is a hollow inner rail member 40 for supporting the slide-out room section thereon. As shown in FIGS. 7 and 8, each of the inner rail members 40 is a rectangular tube, having a generally closed upper wall 42, closed sidewalls 44 and a closed bottom wall 46 along which a downwardly projecting gear track 48 is welded for engagement with an associated spur gear 50 to form a rack and pinion drive system as fully described in U.S. Pat. No. 5,758,918. Each of the inner rail members 40 has an inner end 52 confined within one of the outer rail members 32 and an outer end 54 adapted for pivotal attachment to the slide-out floor 20 at pivotal connection 62, as shown in FIG. 6. Since the angle change between the rails and floor is relatively small as the slide-out room is extended and retracted, providing a hinge joint may not be necessary in all applications, flexing of even relatively rigid end connections in those applications being sufficient to enable the pivoting of the inner rails relative to the slide-out floor which occurs.

As shown in FIGS. 4 and 5, the inner rail members 40 are carried in outer rail members 32 by means of an upper roller arrangement rotatably mounted at the inner end 52 of each inner rail member 40, and a lower roller arrangement rotatably mounted on a bracket 60 rigidly mounted to the vehicle 10 as further described in U.S. Pat. No. 5,758,918 incorporated herein by reference. As illustrated, bracket 60 is two plates welded to the sides of the outer rail 32, with bearings 61 attached to them for rotatably supporting the drive shaft 84. The rail members 32 and 40 need not be of rectangular tubular contruction, but could be U-shaped channels, or other suitable construction, or the outer rail member 32 could be replaced by a frame of suitable construction.

The upper roller arrangement shown in FIG. 7 is comprised of a large roller 58 centrally disposed between a pair of spaced bushings 68 for free rotation on a shaft 62 supported in the sidewalls 44 of the inner rail member 40. The large roller 58 projects through an opening at the inner end of upper wall 42 of each inner rail member 40 and into continuous rolling engagement with the underside of the upper wall 34 of the outer rail member 32.

As shown in FIG. 6, the slide-out floor 20 and each inner rail member 40 are pivotally secured at pivot 62. The axis of pivot 62 runs laterally, i.e. from side to side of the slide-out-floor 20. Slide-out floor pivot arm 92 and inner rail member pivot yoke 94 are rigidly secured to the respective members by bolts or any other suitable means. The length of the pivotal attachment as shown in FIGS. 5 and 6 is a distance, x, that may vary depending upon the length of the pivot arm 92 and yoke 94. In addition, the pivot 62 may be provided by a rigid connection, provided it is not so rigid as to inhibit the small amount of pivoting which must occur between the outer end of the member 40 and the outer end of the floor 20.

In the present invention, the inner rail member 40, whether substantially retracted or extended, is at a downwardly and outwardly sloping angle relative to the outer rail 32. As the inner rail 40 is extended from the outer rail 32, the angle becomes progressively greater as the roller 58 at the inner end of the inner beam 40 rolls along the top wall 34 of the outer beam 32, thereby changing the axial position of this point of contact between the outer and inner members 32 and 40, relative to the outer member 32, while maintaining the vertical position of that point, provided the outer member 32 is horizontal. At the outer end of the outer member 32, the rollers 86 supporting the inner member 40 and roll along it, changing in axial position relative to the inner beam 40 as they roll along it, but maintaining the point of contact at the same vertical position, provided the outer beam is horizontal. Thus, extension of the inner member 40 brings the points of contact between the outer 40 and inner 32 members, one of those points being at the inner end of the inner member 40 and the other point being at the outer end of the outer member 32, axially closer together, while maintaining the vertical spacing between those points. Since the vertical spacing between those points is substantially greater than the spacing between those points as measured along a line which is perpendicular to the longitudinal axis of the inner member 40, the angle of the inner member 40 relative to the outer member 32 becomes progressively greater as the inner member 40 is extended. This angle changes to an extent such that, at full extension, the outer end of the rail 40 is lowered an amount such that the outer end of the moveable floor 20 is in substantially the same plane as the stationary floor 74. The inner end of the moveable floor 20 ramps or otherwise moves down to the same level to bring the entire moveable floor 20 into substantially the same plane as the stationary floor 74.

As illustrated in FIGS. 4 and 5, each outer rail member 32 is mounted substantially parallel to the fixed floor 74. The distance between the spur gear 50 and the upper wall 34 of the outer rail member 32 is sized appropriately to allow the inner rail member 40 to form the downward and outwardly sloping angle referred to above, such that the outer end of the moveable floor 20 is lowered a distance such that the outer end of the moveable floor 20 will be in the plane of the stationary floor 74. This distance is equal to the height of the end of the moveable floor 20 above the stationary floor 74 when the moveable floor 20 is in the completely retracted position. The precise angle will depend on a number of factors, including the weight of the room, the stiffness of the room structure and of the inner and outer rails, and the fit and alignment of the various parts of the assembly. Adjustment of the precise height of each of the gears 50 and the support rollers 86, and therefore adjustment of the angle and associated drop in height, is possible by adjusting the positions of the bearings 61 which are bolted to the brackets 60, or it could be set by adjusting it prior to welding the plates 60 to the outer rail 32. It could also be adjusted by changing the diameter of the inner rollers 58.

As shown in FIG. 8, and referred to above, the inner rail support arrangement mounted at the outer, exit end of each outer rail member 32 includes the gear 50 and a pair of freely rotatable support rollers 86 positioned on either side of gear 50 on a common shaft 84, which is the drive shaft for both gears 50. As stated above, the shaft 84 may be driven by any suitable means, e.g., an electric motor with a built-in gear reduction transmission and brake, of the type which is commercially available from a number of sources. Each of the large rollers 86 rides in continuous rolling engagement with the bottom wall 46 of the inner rail member 40 along the sides of the gear rack 48, being positioned between the gear rack 48 and the adjacent side edges of the bottom wall 46 of inner rail 40. The inside edges of rollers 86 may engage the angled edges of welds 74 to maintain alignment of inner rail members 40 with outer rail members 32. The upper and lower roller arrangements thus provide vertical support for slide-out floor 20 when retracted and at the same time permit smooth, low friction in and out telescopic movement of slide-out floor 20 relative to the vehicle body 10. Adjusting the height of the shaft 84 by either of the methods described above, i.e., adjusting the bearings 61 or making the adjustment before welding the plates 60 to the outer rail 32, adjusts the height of the support rollers 86 as well as the corresponding gear 50, so as to obtain the proper inclination angle and the proper drop in height of the outer end of the moveable floor 20. If the inclination angle and drop in height are adjusted by changing the diameter of the inner rollers 58, no adjustment need be made to the height of the rollers 86 or gear 50.

If a different drive arrangement is used, e.g., a different gear drive arrangement, a hydraulic drive arrangement, a cable drive arrangement or a combination gear, hydraulic, cable or other drive arrangement, the inner rail will still be angled relative to the outer rail to practice this invention. Any drive arrangement may be used to practice the present invention.

As illustrated, the inner end 76 of slide-out floor 20 and the outer end 78 of fixed floor 74 have some means to drop the inner end of the moveable floor 20 to the proper height. This may be any suitable means. As illustrated, the inner end of the moveable floor 20 may be dropped to be flush with the stationary floor 74 by a pair of ramped surfaces 80, 82 engageable with each other when the slide-out floor 20 is moved to the extended position of FIG. 5.

At the fully extended position shown in FIG. 5, the top surfaces of fixed floor 74 and slide-out floor 20 are flush or coplanar with each other. The longitudinal axis of each outer rail 32 is substantially parallel to the top surface of fixed floor 74, and the longitudinal axis of each inner rail 40 is at an angle to the longitudinal axis of the outer rail 32.

In operation, as shown in FIGS. 3–5, slide-out floor 20 is normally nested inside stationary room portion 56 when the vehicle 10 is in transit. In this position, slide-out floor 20 is disposed above fixed floor 74. With the vehicle 10 parked and leveled, inner rails 40 are telescoped out of outer rails 32 using any suitable drive arrangement, to commence outward movement of slide-out floor 20 relative to room 56, and thereby sliding movement of movable floor 20 directly upon fixed floor 74 as shown in FIGS. 4 and 5.

As slide-out floor 20 is moved outward, the inner rail member 40 continuously pivots about the axis of the outer supports, i.e., about the axis of the gear 50 and rollers 86, to bring the inner rail 40 in the fully extended position to rest at a certain angle $\Theta$ with respect to the outer rail 32. By appropriately sizing the entire length of the outer rail member 32 and allowing the inner rail member 40 to continuously pivot as it is extended and retracted, outer rail member 32 does not require any special fabrication steps or modifications to achieve the desired inner rail 40 orientation when fully extended. Abrupt drops, lifts or changes in direction are avoided. By allowing the inner rail member 40 to approach its angled orientation continuously while the inner rail is in motion, a smooth transition is made in the height of the moveable floor 20.

As slide out floor 20 is moved further to its extended position shown in FIG. 5, inclined bearing surface 82 of slide-out floor 20 slides downwardly on inclined bearing surface 82 of fixed floor 74 until slide-out floor 20 is in its fully extended position as shown in solid lines in FIG. 5, in which bearing surfaces 80, 82 are fully engaged with each other to support the inner end 76 of slide-out floor 20. Slide-out floor 20 is thus lowered into position beside fixed floor 74 as inner rail member 40 is extended.

The inner end of slide-out floor 20 is supported by engagement of bearing surface 80 with bearing surface 82. If desired, additional support structure may be employed to support the edges and interior portions of slide-out floor 20 when in its fully lowered position so as to provide adequate support for slide-out floor 20 during use. As shown in FIGS. 3–5, a relatively thin splice plate 90 may be provided along the inner end 76 of slide-out floor 20 to cover the joint, if desired.

When slide-out floor 20 is moved from its extended position to its retracted position, angled bearing surface 80 of slide-out floor 20 rides on angled bearing surface 82 of fixed floor 74 to elevate slide-out floor 20 above fixed floor 74, as shown in FIG. 4.

Other embodiments whereby the outer rail member is not parallel to the fixed floor and the inner rail member is not parallel to the outer rail member will also work, however the angle between the components must be changed to accommodate the variations.

With this arrangement, it can be appreciated that the undesirable floor height differential present in prior art expanded slide-out assemblies is eliminated. It should also be understood that rollers or bearings as fully described in U.S. patent application Ser. No. 08/823,168 filed on Mar. 25, 1997, hereby incorporated by reference, may be provided to aid in the lowering of slide-out floor 20 of the present invention relative to fixed floor 74 to prevent the binding or skewing of slide-out section 12 as it moves between its retracted position and its extended position.

In addition, slide bearings may be used instead of the rollers 58 and/or 86 to reduce the friction between the inner and outer rails. The slide bearings may be made convex so as to facilitate the angle change that occurs when the inner rails are extended and retracted.

The invention has been shown and described with slide-out floor 20 being disposed above fixed floor 74 when slide-out floor 20 is in its retracted position. It should be understood that the invention also could be applied to an arrangement in which slide-out floor 20 is lowered below fixed floor 74 when slide-out floor 20 is retracted, and then raised up as slide-out floor 20 is extended so as to result in the upper surface of slide-out floor 20 being coplanar with fixed floor 74. In either case, inner rail member 40 is at an angle to the outer rail 32 so as to bring the outer end of the slide-out floor into the plane of the fixed floor.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not limit the invention, except as otherwise required by law.

What is claimed is:

1. In a flat floor slide-out assembly having a first floor, a second floor mounted so as to be movable with respect to said first floor between an extended position in which said second floor is a substantially flush extension of said first floor and a retracted position in which at least half of said second floor overlaps said first floor, a first support member mounted under said first floor, and a second support member telescopically mounted to said first support member and having an outer end mounted to said second floor so as to push or pull said second floor between said extended position and said retracted position, the improvement wherein said second support member is at an outwardly and downwardly inclined angle relative to said first support member in said retracted position, said angle progressively increasing as said second floor is moved from said retracted position to said extended position.

2. The improvement of claim 1, wherein said first support member is substantially parallel to said first floor.

3. The improvement of claim 1, wherein said outer end of said second support member is pivotally connected to said second floor.

4. The improvement of claim 1, wherein said second support member has a first roller arrangement at an inner end of said second support member and said first support member has a second roller arrangement at an outer end of said first support member, said first roller arrangement and said second roller arrangement being positioned to obtain an angle at said extended position which positions an outer end of said second floor substantially coplanar with said first floor in said extended position.

5. The improvement of claim 1, wherein a vertical spacing between points of contact between said first support member and said second support member, which points of contact establish said angle, is substantially the same in said retracted and extended positions.

* * * * *